(12) United States Patent
Robertson (10) Patent No.: US 11,577,558 B2
(45) Date of Patent: Feb. 14, 2023

(54) SYSTEM AND METHOD ON A TOWING VEHICLE TO CONTROL A TOWED VEHICLE'S CONTROLS AND SYSTEMS

(71) Applicant: Toyota Motor Engineering & Manufacturing North America, Inc., Plano, TX (US)

(72) Inventor: Stephen L. Robertson, Surprise, AZ (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 323 days.

(21) Appl. No.: 16/870,693

(22) Filed: May 8, 2020

(65) Prior Publication Data
US 2021/0347216 A1    Nov. 11, 2021

(51) Int. Cl.
| | |
|---|---|
| *G05D 1/00* | (2006.01) |
| *B60D 1/26* | (2006.01) |
| *G07C 9/00* | (2020.01) |
| *G06V 20/59* | (2022.01) |

(52) U.S. Cl.
CPC ............. *B60D 1/26* (2013.01); *G05D 1/0016* (2013.01); *G05D 1/0027* (2013.01); *G06V 20/593* (2022.01); *G07C 9/00309* (2013.01); *G05D 2201/0213* (2013.01)

(58) Field of Classification Search
CPC ........ B60D 1/26; G06V 20/593; G05D 1/001; G05D 1/0027; G05D 9/00309; G05D 2201/0213
See application file for complete search history.

(56) References Cited

U.S. PATENT DOCUMENTS

| | | | |
|---|---|---|---|
| 4,345,775 A | 8/1982 | Merrifield | |
| 4,887,704 A | 12/1989 | Glesmann | |
| 5,090,718 A | 2/1992 | Kauffman | |
| 5,105,517 A | 4/1992 | Barrow | |
| 8,068,019 B2 | 11/2011 | Bennie et al. | |
| 8,075,064 B2 | 12/2011 | Johnson | |
| 8,120,291 B2 | 2/2012 | Clark et al. | |

(Continued)

FOREIGN PATENT DOCUMENTS

DE           102015011016 A1 *   3/2016   ............. B60R 25/30

OTHER PUBLICATIONS

DE-102015011016-A1 machine translation (Year: 2016).*

(Continued)

*Primary Examiner* — Anne Marie Antonucci
*Assistant Examiner* — Jingli Wang
(74) *Attorney, Agent, or Firm* — Snell & Wilmer LLP (57) ABSTRACT

A one-touch control system for operating the controls of a towed vehicle using a towing vehicle. The system includes an electronic control unit integrated into the towed vehicle and configured to receive a selection signal from the towing vehicle and simultaneously control a number of different components based on the selection signal. The components including a switch configured to turn on and off the towed vehicle, a sensor configured to detect whether a passenger is present in the towed vehicle, and an odometer configured to be deactivated when the switch indicates that the towed vehicle is off and the sensor indicates that there are no passengers in the towed vehicle.

20 Claims, 4 Drawing Sheets

(56) References Cited

U.S. PATENT DOCUMENTS

| | | |
|---|---|---|
| 8,262,173 B2 | 9/2012 | Crawford |
| 9,120,359 B2 | 9/2015 | Chiu et al. |
| 9,193,232 B2 | 11/2015 | Huntzicker |
| 9,199,521 B2 | 12/2015 | Brombach et al. |
| 9,694,768 B2 | 7/2017 | Wojcik et al. |
| 10,207,687 B1 | 2/2019 | Shimizu et al. |
| 2010/0241309 A1* | 9/2010 | Demirdjian ........... B60R 21/015 701/45 |
| 2014/0324248 A1* | 10/2014 | Huntzicker .............. B60D 1/24 701/1 |
| 2018/0186377 A1* | 7/2018 | Bramson ............... B60W 10/30 |

OTHER PUBLICATIONS

Remote Battery Disconnect, Roadmaster, Inc.
Odometer disable while flat towing, The RV Forum Community, (printed January 2020).

* cited by examiner

SYSTEM AND METHOD ON A TOWING VEHICLE TO CONTROL A TOWED VEHICLE'S CONTROLS AND SYSTEMS

BACKGROUND

Field

This disclosure relates to a system and a method on a towing vehicle to control a towed vehicle's controls and systems.

Description of the Related Art

Many vacationers and travelers like to tour and sightsee in their cars or vehicles and oftentimes buy or rent a motorhome or a recreational vehicle (RV) to enhance their comfort and enjoyment. For extended vacations, the motorhome or the RV may be hooked up to tow another vehicle (e.g., their car or vehicle, a cargo trailer, a smaller vehicle, or a sports utility vehicle (SUV)). When parked, the vehicle being towed can be disconnected from the towing vehicle to allow the vacationers and travelers to take excursions or drive into town and have a more mobile, fuel efficient and compact vehicle while the motorhome or the RV is parked at a campground, for example.

In many situations, the vehicle being towed (sometimes referred to as a towed vehicle) is being flat-towed (i.e., all wheels are on the ground). The towed vehicle may have a flat-towing transmission mode, which is manually set by a user of the towed vehicle. That is, the user must be inside the cabin of the towed vehicle to place the towed vehicle in the flat-towing transmission mode. The flat-towing transmission mode decouples the transfer case and the transmission or places the transmission in neutral in order to allow the towed vehicle to roll freely when being towed by the towing vehicle. Similar towing transmission modes are available that decouple the transfer case and transmission during a flat towing scenario.

These flat-towing transmission modes only adjust the transmission of the towed vehicle in order to be towed by the towing vehicle. Therefore, what is needed is an integrated one-touch control system and method on a towing vehicle to control the systems of the towed vehicle.

SUMMARY

In general, one aspect of the subject matter described in this disclosure may be embodied in a one-touch control system for operating the controls of a towed vehicle using a towing vehicle. These and other aspects or embodiments may optionally include one or more of the following features. The system includes an electronic control unit integrated into the towed vehicle and configured to receive a selection signal from the towing vehicle and simultaneously control a number of different components based on the selection signal. The components including a switch configured to turn on and off the towed vehicle, a sensor configured to detect whether a passenger is present in the towed vehicle, and an odometer configured to be deactivated when the switch indicates that the towed vehicle is off and the sensor indicates that there are no passengers in the towed vehicle.

A method for remotely controlling functions and operations of a towed vehicle using a towing vehicle. The method includes receiving, at a first electronic control unit, a selection signal indicating a selection of items to adjust or change on a towed vehicle. The method also includes receiving, at the first electronic control unit, a selection of a flat-towing mode from a second electronic control unit. The method also includes simultaneously sending signals to a plurality of components of the towed vehicle in response to receiving the selection of the flat-towing mode, the signals being based on the selection signal and being used to turn on or turn off the plurality of components.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are integrated one-touch control systems and methods on a towing vehicle to control the systems and odometer of the towed vehicle. Particular embodiments of the subject matter described in this disclosure may be implemented to realize one or more of the following advantages. The systems and methods allow the controls in the towing vehicle to adjust and control the towed vehicle systems. This advantageously allows the driver or the user of the towing vehicle to selectively set or control the features and systems of the towed vehicle without having to go into the towed vehicle to make these adjustments or determine which adjustments to make.

A driver or a passenger inside the towing vehicle can access a touch screen inside the towing vehicle to select a number of features or systems to adjust or control of the towed vehicle and then select a single, one-touch "Flat Towing Mode" which automatically initiates or makes these multiple, simultaneous adjustments to the systems and controls of the towed vehicle without the driver or the passenger being in or having to go into the towed vehicle. As an example, the driver can press a Flat Towing Mode button on the touch screen in the towing vehicle to activate a flat towing mode, which automatically and simultaneously adjusts a number of different systems and components of the towed vehicle.

Once selected, the flat towing mode may, for example, turn on the towed vehicle for a short period of time to make all the system adjustments or changes and then turn off the towed vehicle, place the transmission in neutral for purposes of towing, decouple the transfer case, sense the seats or seat belts to ensure that no passengers are in the towed vehicle, place the HVAC vents to recirculate (e.g., air recirculation mode), close all the windows, lock all the doors and trunk, deactivate the alarm system, disable or deactivate the odometer so that unnecessary mileage is not added to the towed vehicle, turn off unnecessary power consuming devices and components, unlock the steering wheel, blackout the windows, allow body security functions, etc.

The one-touch flat towing mode provides simultaneous electrical and/or mechanical adjustments to the systems and controls of the towed vehicle so that the driver or the user does not have to go into the towed vehicle to manually perform all the adjustments one at a time. This advantageously saves a lot of time and prevents errors or missing functions. For example, the driver or the user may not know which settings or controls to change in order to flat tow a vehicle so the one-touch flat towing mode advantageously prevents any improper or missed adjustment to one or more of the systems or settings on the towed vehicle. Also, this allows the settings and functions to be controlled remotely from another vehicle (e.g., the towing vehicle).

Figure 1:
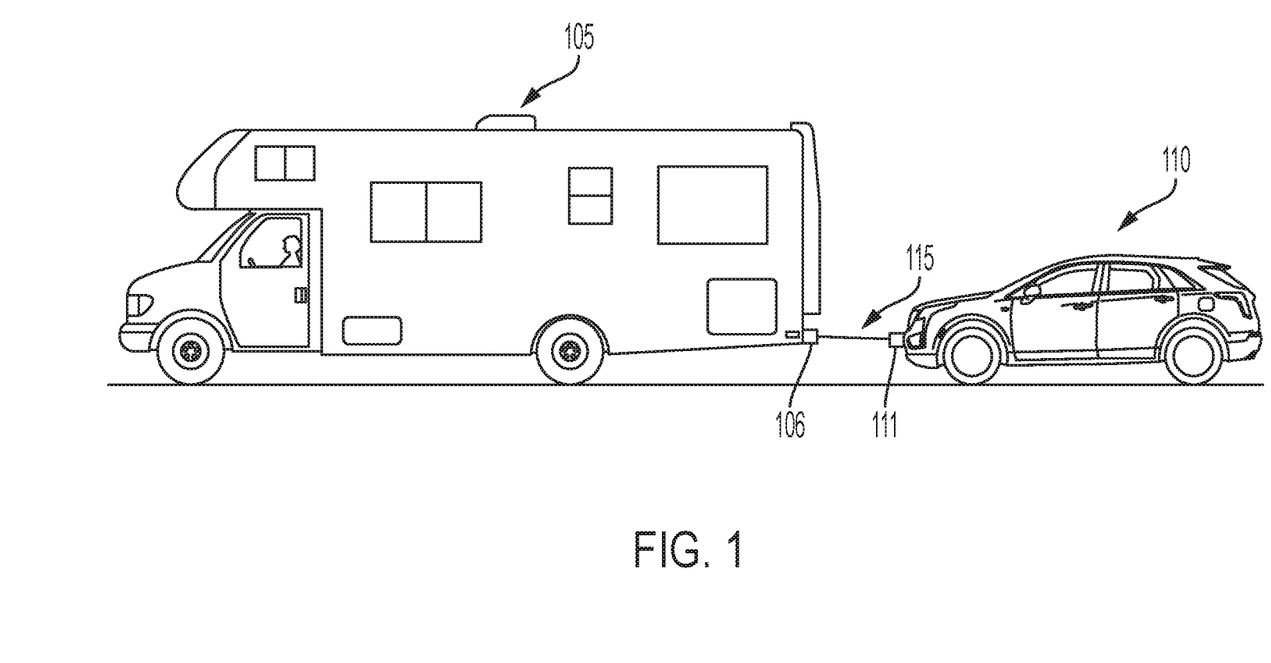
FIG. 1 is an exemplary drawing showing a towing vehicle towing a towed vehicle where the towed vehicle is being flat towed according to an aspect of the invention.

FIG. 1 is an exemplary drawing showing a towing vehicle 105 (e.g., a motorhome or a recreational vehicle (RV)) towing a towed vehicle 110 (e.g., a sports utility vehicle (SUV)) 110 where the towed vehicle 110 is being flat towed (i.e., all wheels are on the ground). A towing rod or bar 115 is generally used to secure and attach the towing vehicle 105 to the towed vehicle 110. The towing vehicle 105 may have a bumper and/or a connector 106 that is used to connect the towing vehicle 105 to the towing rod or bar 115, which is connected to a bumper and/or a connector 111 of the towed vehicle 110. When the connector 106 is connected to the connector 111, the connector combination sends a signal to the ECU 310 and the ECU 320 indicating that the two vehicles are properly connected.

The towing vehicle 105 and the towed vehicle 110 may be a conveyance capable of transporting a person, an object, or a permanently or temporarily affixed apparatus. The towing vehicle 105 and the towed vehicle 110 may be a self-propelled wheeled conveyance, such as a motorhome or a recreational vehicle (RV), a car, a sports utility vehicle, a truck, a bus, a van, a trailer or other motor, battery, or fuel cell driven vehicle. For example, the towing vehicle 105 and the towed vehicle 110 may be an electric vehicle, a hybrid vehicle, a hydrogen fuel cell vehicle, a plug-in hybrid vehicle or any other type of vehicle that has an engine, a fuel cell stack, a motor and/or a generator. Other examples of vehicles include bicycles, trains, planes, or boats, and any other form of conveyance that is capable of transportation. The towing vehicle 105 and the towed vehicle 110 may be semi-autonomous or autonomous. That is, the towing vehicle 105 and the towed vehicle 110 may be self-maneuvering and navigate without human input. An autonomous vehicle may have and use one or more sensors (e.g., autonomous driving sensors) and/or a navigation unit to drive autonomously.

Figure 2:
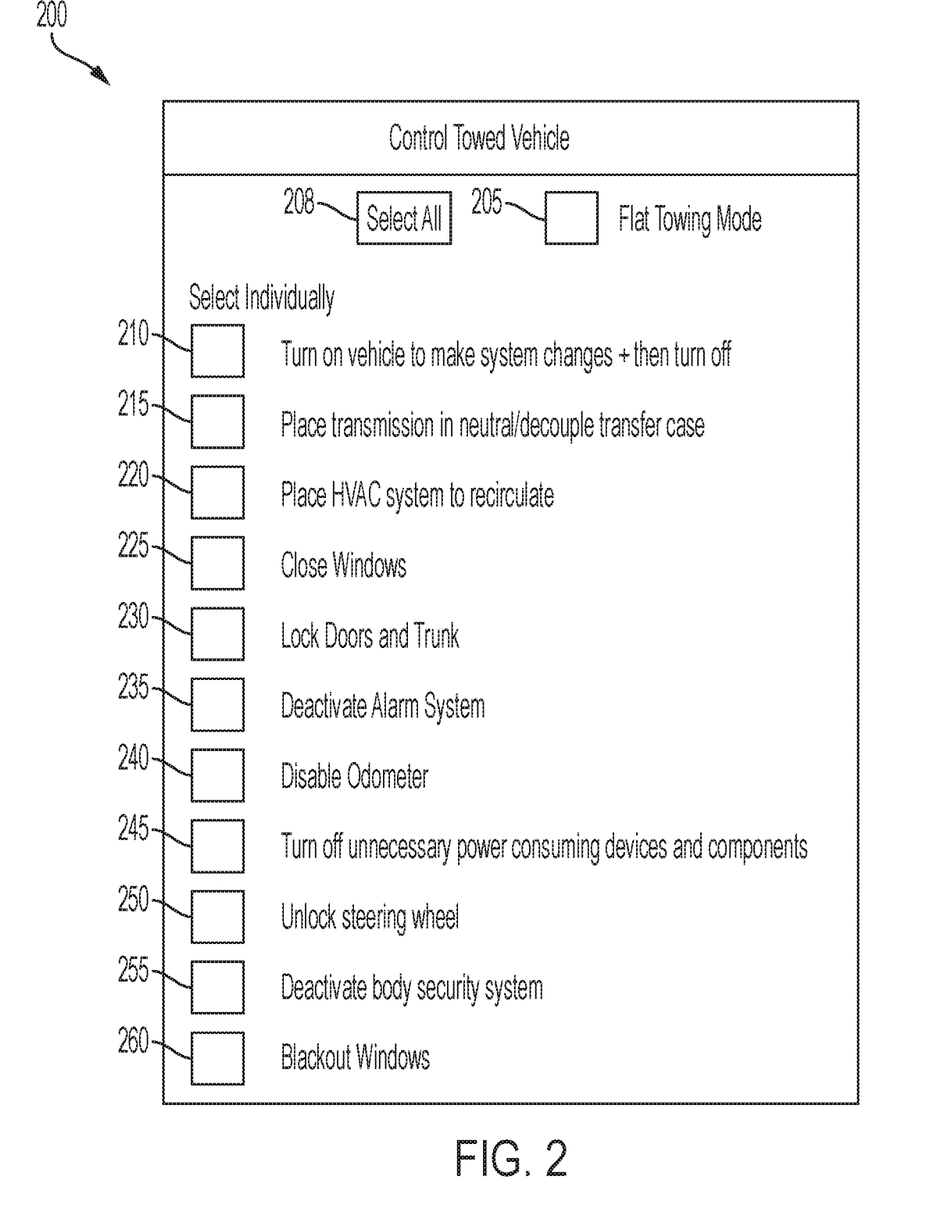
FIG. 2 is a screen shot of a display or interface that may be integrated into or be inside the passenger compartment of the towing vehicle according to an aspect of the invention.

FIG. 2 is a display or interface 200 that may be integrated into or be inside the passenger compartment of the towing vehicle 105. Preferably, the display or interface 200 is a touch screen viewable by the driver so that the driver can make selections thereon and view the display or interface 200 while driving. A software routine of the ECU 310 can cause the display or interface 200 to display a Control Towed Vehicle screen (as shown) to allow for control of the towed vehicle 110.

Figure 4:
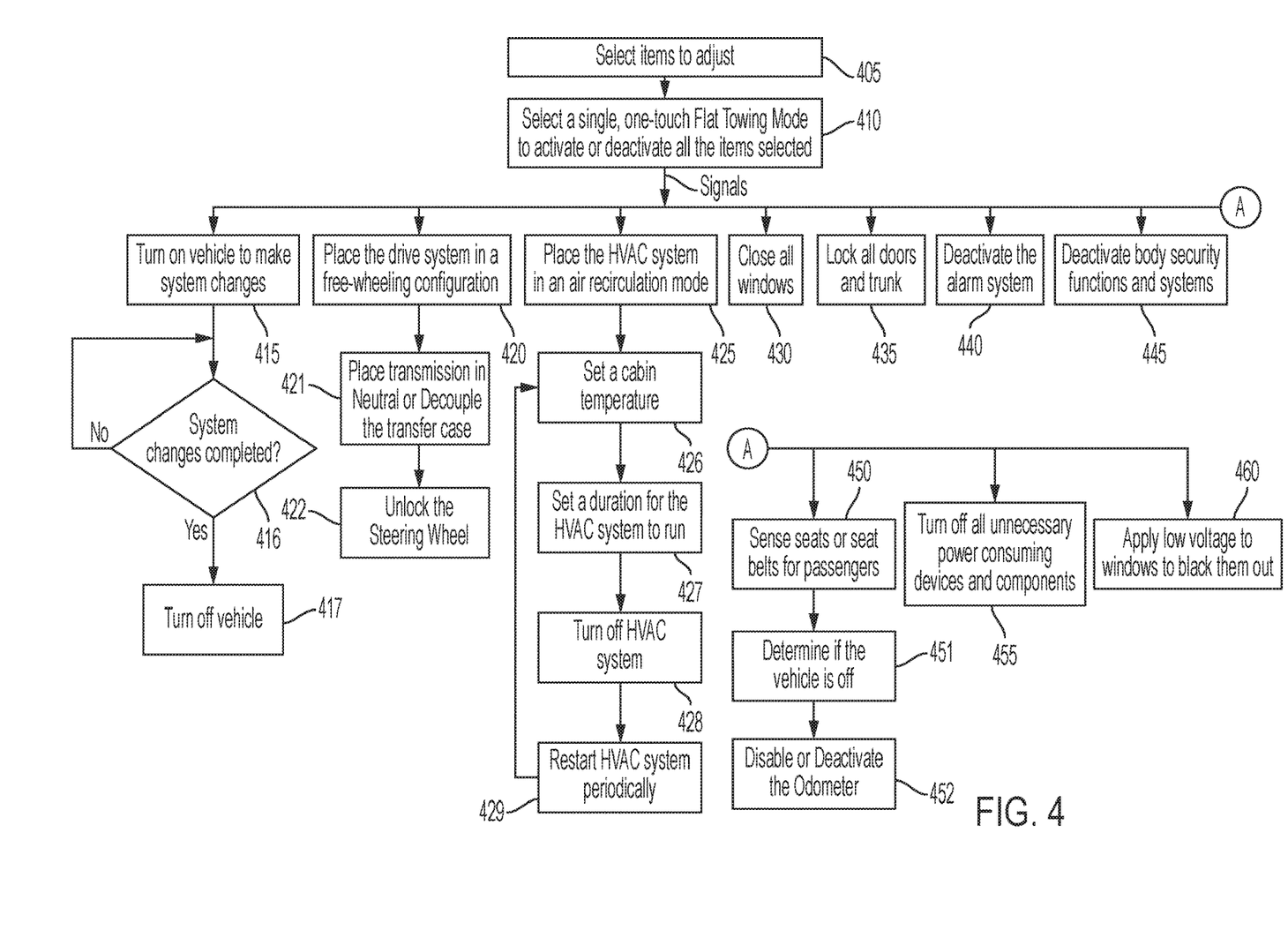
FIG. 4 is a flow chart showing a single, one-touch selection of a Flat Towing Mode which automatically initiates or makes multiple, simultaneous adjustments to the systems and controls of the towed vehicle according to an aspect of the invention.

FIG. 4 is a flow chart showing a single, one-touch selection of a Flat Towing Mode which automatically initiates or makes multiple, simultaneous adjustments to the systems and controls of the towed vehicle. Referring to FIGS. 2 and 4, the Control Towed Vehicle screen allows for the driver or the user of the towing vehicle to select items to adjust or change (405) (all at once 208 or individually 210-260) and then makes a one-touch selection 205 to place the towed vehicle 110 in a flat towing mode (410). The one-touch selection 205 activates or selects two or more of the selections shown on the Control Towed Vehicle screen. The driver or the user can program the one-touch selection 205 to activate or control two or more selections he or she desires to adjust or change when the one-touch selection 205 is made. The one-touch selection 205 is a simple, easy to execute function.

As an example, the one-touch selection 205 can activate or control two or more (or all) of the following selections, functions, systems or operations. First the selections are made either individually (210-260) or all of them (208) and then the one-touch flat-towing mode is activated or selected (205) to simultaneously adjust or change the selected items. Selection 208 selects all the items listed. Selection 210 turns on the towed vehicle 110 to allow for the system adjustments or changes (415), waits for a short period of time (e.g., 1 minute) for all the system adjustments or changes to be made (416) and then turns off the towed vehicle 110 after the systems have been adjusted or changed (417). That is, the engine or the batteries of the towed vehicle 110 are turned on or activated to provide power or charge to the systems and components of the towed vehicle 110. The systems and components can then be adjusted or changed while obtaining power or charge from the towed vehicle 110. Once the systems and components have been adjusted or changed, the towed vehicle 110 is turned off.

Selection 215 places the drive system of the towed vehicle 110 in a freewheeling configuration (420). For example, selection 215 may place the transmission of the towed vehicle 110 in neutral for purposes of towing and/or may decouple the transfer case (421). This allows the vehicles of the towed vehicle 110 to move freely.

Selection 220 places the HVAC system into an air recirculation mode. For example, the HVAC system can be controlled to automatically turn on, the HVAC system can be set to an air recirculation mode (425), the temperature can beset to a normal cabin temperature (e.g., 80 degrees Fahrenheit) (426), the HVAC system can run for a set period of time (e.g., 1-2 minutes) (427) and then turned off (428). The timer can be set to restart the HVAC system periodically (e.g., every 1 hour) (429) for a set period of time (e.g., 1-2 minutes) to allow the cabin air to be periodically circulated by the HVAC system while the towed vehicle 110 is being towed. This allows the cabin air to be circulated and filtered and prevents dust and carbon monoxide from entering into the cabin while the towed vehicle 110 is being towed.

Selection 225 closes all the windows of the towed vehicle 110 (430). Selection 230 locks all the doors and the trunk of the towed vehicle 110 (435). Selection 235 deactivates the alarm system (440) and selection 255 deactivates the body security functions or systems 395 (e.g., external and internal cameras, etc.)(445). The body security functions and system 395 are used to monitor and record any suspicious or damaging activities done to or around the towed vehicle 110.

Selection 240 disables or deactivates the odometer so that unnecessary mileage is not added to the towed vehicle 110 and unnecessary warranty loss is avoided. In one embodiment, prior to disabling or deactivating the odometer, sensors coupled to each to seat and/or seat belt are used to sense that no driver or passenger is in the towed vehicle 110 (450). If the driver or a passenger is in any of the seats, the odometer is prevented from being disabled or deactivated.

This ensures that no one accidently or inadvertently disables or deactivates the odometer. In addition, prior to disabling or deactivating the odometer, the control system determines whether the vehicle is off (451). This ensures that no driver or autonomous system is operating the towed vehicle 110 before the odometer 375 is allowed to be deactivate or disabled. If both of these conditions are met, the control system disables or deactivates the odometer (452).

Selection 245 turns off all unnecessary power consuming devices and components of the towed vehicle 110 (455). For example, some of these devices and components can include the radio, sound system, charging ports, cameras, sensors, front lights, front turn signals, interior lights, etc.

Selection 250 unlocks the steering wheel or column to allow free steering (422).

Selection 260 blacks out all the windows (460). This can be accomplished by applying a low voltage from the battery 390 to the glass or windows to change the windows from clear to black or opaque. Darkening the windows protects the interior, reduces the heat inside the towed vehicle 110, and prevents bystanders from looking inside the cabin.

Figure 3:
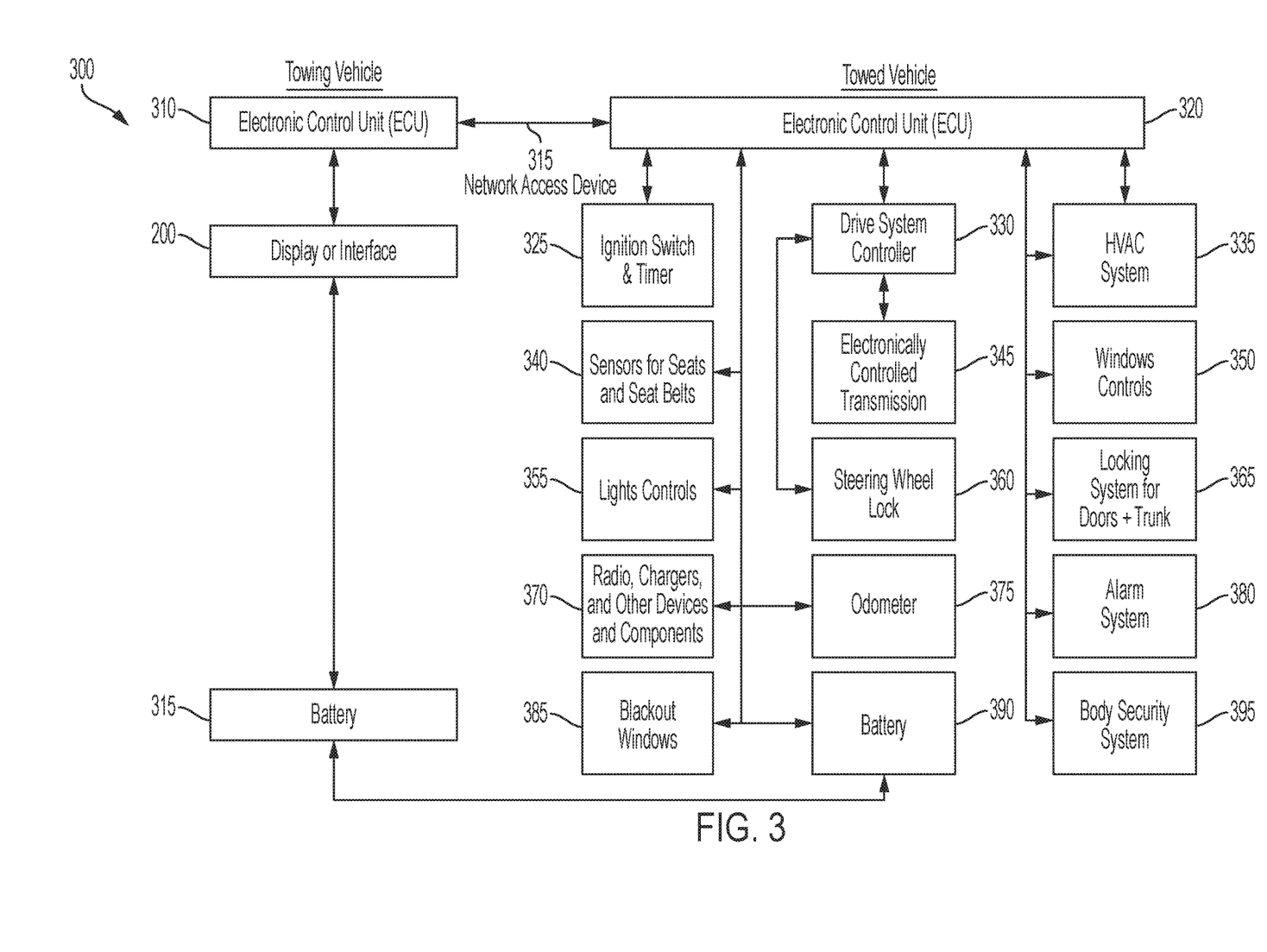
FIG. 3 is a block diagram of a one-touch control system to allow the towing vehicle to control and operate the controls and systems of the towed vehicle according to an aspect of the invention.

FIG. 3 is a block diagram of a one-touch control system 300 to allow the towing vehicle 105 to control and operate the controls and systems of the towed vehicle 110. The control system 300 includes an electronic control unit (ECU) 310 connected to the display or interface 200. The ECU 310 and the display or interface 200 are part of and built into the towing vehicle 105. The ECU 310 sends signals to, receives signals from and communicates with an electronic control unit (ECU) 320 of the towed vehicle 110.

One or more network access devices 315 may be used to communicate information and data between the ECU 310 and the ECU 320. The network access device 315 may include any network access device capable of communicating via a wireless protocol. For example, the network access device 315 may communicate via Bluetooth, Wi-Fi, a cellular protocol, vehicle to vehicle (V2V) communications, Zigbee, or any other wireless protocol. The network access device 315 may be referred to as a data communication module (DCM) and may communicate with any device on the towing vehicle 105 and/or the towed vehicle 110.

The ECU 310 and the ECU 320 can each include one or more processors and a memory. The ECU 310 and the ECU 320 may be electrically connected or coupled to some or all the components including one or more vehicle components of the towing vehicle 105 and the towed vehicle 110, respectively.

Based on signals received from the ECU 310, the ECU 320 processes the received signals and/or sends one or more signals (sometimes simultaneously) to each of the one or more following components, devices or systems: an ignition switch and timer 325, a drive system controller 330, a HVAC system 325, sensors 340 for seats and seat belts, an electronically controlled transmission (ECT) 345, windows controls 350, lights controls 355, a steering wheel lock 360, a locking system 365 for the doors and trunk, radio, chargers, and other devices and components 370, an odometer 375, an alarm system 380, a blackout windows setting 385, a battery 390, and body security system 395. The various signals may be an activate or ON signal, a deactivate or OFF signal, and/or other specific information (e.g., cabin temperature, periodic time interval, specific time of operation, etc.) to control each of the one or more components, devices or systems as described herein.

The ECU 320 can adjust or change the signal received from the ECU 310 depending on one or more factors, such as the charge (or state of charge) of the battery 390. For example, the ECU 320 can change the active or ON signal received from the ECU 310 for a particular component or device (e.g., the HVAC system 325) to a deactivate or OFF signal to conserve the charge of the battery 390 (e.g., if the battery 390 has a charge less than or equal to a low battery threshold (e.g., 20 percent)). Hence, the ECU 320 can turn on and off specific devices or components depending on the charge (or state of charge) of the battery 390. In addition, if the ECU 320 detects that the battery 390 has a low charge, the ECU 320 can provide this information to the ECU 310, which can activate its battery 315 to wirelessly or wire charge the battery 390.

The ignition switch and timer 325 is connected to the ECU 320. The ignition switch and timer 325 is used to automatically turn on and off the towed vehicle 110 (e.g., the engine or the batteries of the towed vehicle 110). The ignition switch and timer 325 can also start its timer once the on signal has been received to keep track of how long the engine or the batteries of the towed vehicle 110 is on. After the set time (e.g., 30 seconds) on the timer ends, the ignition switch and timer 325 receives an off signal from the ECU 320. That is, the ECU 320 sends an off signal to the ignition switch and timer 325 to turn off the engine or the batteries of the towed vehicle 110. The towed vehicle 110 is turned on to allow for system adjustments or changes. That is, the engine or the batteries of the towed vehicle 110 are turned on or activated to provide power or charge to the systems and components of the towed vehicle 110. The systems and components can then be adjusted or changed while obtaining power or charge from the towed vehicle 110. Once the systems and components have been adjusted or changed, the towed vehicle 110 is turned off. The systems and components can be adjusted or changed when the towed vehicle 110 is moving or stationary (i.e., not moving).

The drive system controller 330 is connected to the ECU 320 and is used to electrically and/or mechanically adjust the drive system (e.g., transmission, motors, gears, brakes, etc.) of the towed vehicle 110. For example, the drive system controller 330 may place the electronically controlled transmission 345 of the towed vehicle 110 in neutral for purposes of towing and/or may decouple the transfer case. The drive system controller 330 can also lock and unlock the steering wheel 360. These adjustments allow the towed vehicle 110 to move freely. The ECU 320 and/or the drive system controller 330 may first check, via the connector combination, whether the towed vehicle 110 is properly connected to the towing vehicle 105 before placing the transmission 345 of the towed vehicle 110 in neutral, decoupling the transfer case, and/or unlocking the steering wheel 360.

The HVAC system 335 is connected to the ECU 320. The ECU 320 can send a signal to the HVAC system 335 to place the HVAC system 335 into an off recirculation mode or an air recirculation mode. The off recirculation mode closes the vents and shuts off the HVAC system 335 so no outside air can come into the passenger compartment. The air recirculation mode turns on the HVAC system 335 and sets the internal cabin temperature to a specific temperature. For example, the ECU 320 can be configured to control the HVAC system 335 to automatically turn on, to be set to an air recirculation mode, to be set to a normal cabin temperature (e.g., 80 degrees Fahrenheit), and to turn on periodically (e.g., every 1 hour) for a specified time period (e.g., 1-2 minutes) to allow the cabin air to be periodically circulated while the towed vehicle 110 is being towed. The specified time period is advantageously set to allow the cabin air to be circulated and filtered while at the same time conserving energy use of the battery 390.

One or more sensors 340 are connected to the ECU 320 and to each seat and/or seat belt in the towed vehicle 110. The sensors 340 can be load sensors, cameras, seat belt sensors, seat weight sensors, etc. The sensors 340 can detect whether a person, a car seat, or an occupant is sitting in one or more of the seats of the towed vehicle 110. This information is sent to the display or interface 200 of the towing vehicle 105 to inform the driver of the towing vehicle 105 that someone is inside the towed vehicle 110. This information is also used by the ECU 320 to determine whether or not to disable or deactivate the odometer 375.

The windows controls 350, the lights controls 355, the locking system 365 for the doors and trunk, and the alarm system 380 are connected to the ECU 320. The ECU 320 sends signals to the windows controls 350 to close all the windows, the locking system 365 to lock the doors and trunk, and the alarm system 380 to deactivate the towed vehicle's alarm system. The ECU 320 can send signals to the lights controls 355 to shut off the front lights and synchronize the rear lights of the towed vehicle 110 to the rear lights of the towing vehicle 105. Hence, when the driver of the towing vehicle 105 is braking, the brake lights of the towed vehicle 110 are turned on. Similarly, when the turn signal of the towing vehicle 105 is on, the same turn signal on the towed vehicle 110 is on. Hence, the ECU 320 controls the lights of the towed vehicle 110.

The ECU 320 can also turn off the radio, chargers, and other devices and components 370 inside the towed vehicle 110 to save or conserve the charge on the battery 390.

The ECU 320 is also connected to the odometer 375 so that the odometer 375 can be disconnected or disabled to avoid adding mileage to the towed vehicle 110 when the towed vehicle 110 is in neutral and not running. For example, the control system 300 provides failsafe measures such as engine cut-off, and passenger detection (e.g., load sensors, interior cameras, seatbelt sensors, heart rate monitors, etc.) to be used to make sure no driver is operating the towed vehicle 110 before the odometer 375 is allowed to be deactivate or disabled. In one embodiment, the ECU 320 can disable the odometer 375 when the ignition switch 325 is off and the sensors 340 indicate that no one is inside the towed vehicle 110. This allows a true odometer reading to be provided while preventing wrong doers from manipulating the mileage while the towed vehicle 110 is actually being driven and not towed.

The ECU 320 can activate the blackout windows setting 385 to change the polarity of the glass on the windows to make them opaque or black them out. This minimizes the amount of sunlight entering the cabin as well as prevents bystanders from looking inside the towed vehicle 110.

The battery 390 is used to provide power to the one or more vehicle systems and components of the towed vehicle 110.

The body security system 395 include cameras, sensors, motion detectors, etc. used to detect if anyone is tampering or damaging the towed vehicle 110. If the body security system 395 senses a human or an animal outside the towed vehicle 110, the ECU 320 receives a signal from the body security system 395 and then sends a message to the ECU 310, which in turn displays a message on the display or interface 200 indicating that the towed vehicle 110 is being tampered with or damaged.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A one-touch control system for operating controls of a towed vehicle using a towing vehicle, the system comprising:
   a first electronic control unit integrated into the towed vehicle and configured to receive a selection signal from the towing vehicle and simultaneously control a number of different components based on the selection signal, the components including:
      a switch configured to turn on and off the towed vehicle;
      a sensor configured to detect whether a passenger is present in the towed vehicle; and
      an odometer configured to be deactivated or disabled when the switch indicates that the towed vehicle is off and the sensor indicates that there are no passengers in the towed vehicle.

2. The one-touch control system of claim 1 further comprising a second electronic control unit and a display or an interface integrated into the towing vehicle, the display or the interface configured to allow a user to select items of the towed vehicle to adjust or change and the second electronic control unit configured to generate the selection signal based on the items selected by the user and transmit the selection signal to the first electronic control unit after the user selects a flat towing mode.

3. The one-touch control system of claim 1 wherein the first electronic control unit is configured to adjust or change the received selection signal based on an amount of charge of a battery of the towed vehicle.

4. The one-touch control system of claim 1 wherein the first electronic control unit is configured to adjust or change the received selection signal when a battery of the towed vehicle has a charge less than or equal to a low battery threshold.

5. The one-touch control system of claim 1 wherein the switch is configured to turn on the towed vehicle after the first electronic control unit receives the selection signal and turn off the towed vehicle after the sensor detects that no passengers are in the towed vehicle.

6. The one-touch control system of claim 1 wherein the components further include an HVAC system configured to turn on in response to receiving an ON signal, to be set to an air recirculation mode, and to be set to a prescribed cabin temperature for a specified time period to allow cabin air within the towed vehicle to be circulated while the towed vehicle is being towed.

7. The one-touch control system of claim 6 wherein the HVAC system is configured to turn on periodically for the specified time period to allow the cabin air to be periodically circulated while the towed vehicle is being towed.

8. The one-touch control system of claim 1 wherein the components further include windows controls to close all windows, a locking system to lock doors and a trunk, an alarm system to be deactivated, and a body security system to sense a human or an animal outside the towed vehicle.

9. The one-touch control system of claim 1 wherein the first electronic control unit is configured to turn off a radio, chargers, and other devices and components in response to receiving OFF signals corresponding to, respectively, the radio, the chargers, and the other devices and components to save or conserve a charge on a battery of the towed vehicle.

10. The one-touch control system of claim 1 wherein the first electronic control unit is configured to activate a blackout windows setting which adjusts or changes a polarity of glass on windows of the towed vehicle to make the windows opaque or black out the windows.

11. A method for remotely controlling functions and operations of a towed vehicle using a towing vehicle, the method comprising:
receiving, at a first electronic control unit, a selection signal indicating a selection of items to adjust or change on the towed vehicle from the towing vehicle;
receiving, at the first electronic control unit, a selection of a flat towing mode from a second electronic control unit; and
simultaneously sending, via the first electronic control unit, signals to a plurality of components on or within the towed vehicle in response to receiving the selection of the flat towing mode, the signals being based on the selection signal and being used to turn on or turn off the plurality of components, one of the plurality of components being an odometer configured to be deactivated or disabled when the towed vehicle is off and a sensor configured to detect a passenger in the towed vehicle indicates that there are no passengers in the towed vehicle.

12. The method of claim 11 wherein the plurality of components include:
a switch configured to turn on and off the towed vehicle.

13. The method of claim 12 wherein the switch is configured to turn on the towed vehicle after the first electronic control unit receives the selection signal and turn off the towed vehicle after the sensor detects that no passengers are in the towed vehicle.

14. The method of claim 11 wherein the first electronic control unit is configured to adjust or change the received selection signal based on an amount of charge of a battery of the towed vehicle.

15. The method of claim 11 wherein the first electronic control unit is configured to adjust or change the received selection signal when a battery of the towed vehicle has a charge less than or equal to a low battery threshold.

16. The method of claim 11 wherein the plurality of components include an HVAC system configured to turn on in response to receiving an ON signal, to be set to an air recirculation mode, and to be set to a prescribed cabin temperature for a specified time period to allow cabin air within the towed vehicle to be circulated while the towed vehicle is being towed.

17. The method of claim 16 wherein the HVAC system is configured to turn on periodically for the specified time period to allow the cabin air to be periodically circulated while the towed vehicle is being towed.

18. The method of claim 11 wherein the plurality of components include windows controls to close all windows, a locking system to lock doors and a trunk, an alarm system to be deactivated, and a body security system to sense a human or an animal outside the towed vehicle.

19. The method of claim 11 wherein the first electronic control unit is configured to turn off a radio, chargers, and other devices and components in response to receiving OFF signals corresponding to, respectively, the radio, the chargers, and the other devices and components to save or conserve a charge on a battery of the towed vehicle.

20. The method of claim 11 wherein the first electronic control unit is configured to activate a blackout windows setting which adjusts or changes a polarity of glass on windows of the towed vehicle to make the windows opaque or black out the windows.

* * * * *